May 9, 1950 — L. H. STAUFFER ET AL — 2,506,944
NEUTRON METER
Filed Nov. 30, 1949

INVENTORS
Lynn H. Stauffer
Thoma M. Snyder
BY
Roland A. Anderson
ATTORNEY

Patented May 9, 1950

2,506,944

UNITED STATES PATENT OFFICE 2,506,944

NEUTRON METER

Lynn H. Stauffer, Rotterdam Junction, and Thoma M. Snyder, Schenectady, N. Y., assignors, by mesne assignments, to the United States of America as represented by the United States Atomic Energy Commission Application November 30, 1949, Serial No. 130,092

7 Claims. (Cl. 250—83.6)

This invention relates to the measurement of the intensity of neutron radiation and is more particularly concerned with improvements in that type of neutron radiation meter which relies upon the ionization produced by a charged particle emitted by certain neutron sensitive materials upon the absorption of a slow neutron.

As used in this specification and in the appended claims, the following terminology is defined as indicated below:

Thermal Neutrons (slow neutrons)—Neutrons having a substantially Maxwellian number-energy distribution characteristic about an energy value equal to $kT$, where $k$ is a constant and $T$ is the temperature in degrees Kelvin. ($kT=0.025$ electron volts at 15° C.)

Fast Neutrons—Neutrons having an average kinetic energy greater than 100,000 electron volts.

Intermediate Neutrons—Neutrons having an average kinetic energy in the range between that of fast neutrons and that of thermal neutrons.

Fission—The splitting of an atomic nucleus, upon the absorption of a neutron, into a plurality of fragments of greater mass than that of an alpha particle, the splitting being accompanied by the release of energy and a plurality of neutrons.

Fissionable—Having the ability to undergo fission upon the absorption of a slow neutron.

Thermal Diffusion Length of a Material (L)—The square root of the thermal diffusion area.

Slowing Down Length of a Material ($L_f$)—The square root of the neutron age.

Moderator—A non-gaseous material for which the ratio $$\frac{\xi 6s}{6a}$$

is greater than 10, wherein $\xi$ is the average loss in the logarithm of the energy of a fast neutron per elastic collision within the material, $6s$ is the slow neutron elastic scattering cross section per atom of the material, and $6a$ is the slow neutron absorption cross section per atom of the material.

Because of the fact that neutrons are not charged, and therefore, do not produce any ionization directly, in order to detect and measure the intensity of neutron radiation, it is necessary to measure the ionization produced by a charged particle which results from, or is produced by, the primary neutron radiation. One well known device of this character employs a material, such as boron or lithium, which has a high cross section for a reaction involving the absorption of a slow neutron and the immediately subsequent emission of a charged particle. In such devices, the boron or lithium containing material may be in gaseous form and itself be used as the gaseous ionizing medium, or it may be in the form of a coating extending adjacent the gaseous ionizing medium. One form of the latter type of neutron meter is illustrated in U. S. Patent No. 2,288,718, entitled "Device for measuring the intensity of a radiation of slow neutrons by means of ionization chamber," issued July 7, 1942, to H. I. Kallmann.

A serious problem in connection with the above-described types of neutron meter arises from the fact that a neutron absorbing material cannot be placed within a neutron flux region without simultaneously effecting a decrease in the neutron flux in the neighborhood. Since the neutron sensitive material of the meter has a high absorption cross section for neutrons, it acts as a neutron sink, thereby depressing the neutron flux right at the point of detection and decreasing the effectiveness of the neutron sensitive material. This circumstance has heretofore seriously reduced the sensitivity and efficiency of neutron meters of this type.

Furthermore, prior art neutron meters of this type suffer from the disadvantage that their sensitivity to detect neutrons varies sharply with the energy of the neutrons, that is, they are much more sensitive to the slower neutrons. In cases where it is desired to measure the radiation of fast neutrons, or the total radiation of fast and slow neutrons together, this represents a serious disadvantage.

Accordingly, it is an object of the present invention to provide an improved neutron meter characterized particularly by an increased sensitivity over neutron meters heretofore employed.

Another object of the present invention is to provide a neutron meter having means to counteract the depression of neutron flux normally resulting from the presence in the meter of material having a high absorption cross section for neutrons.

A further object of this invention is to provide a neutron meter which is adapted to the measurement of fast, intermediate, or slow neutrons, or the combined radiation of neutrons of all energies.

Another object of the invention is to provide a neutron meter the sensitivity of which varies only slowly with neutron energy so that it has comparable sensitivity to slow and to fast neutrons.

Still another object of the invention is to provide a neutron meter having a large ration of neutron to gamma ray sensitivity so that its readings are subject to minimum error from the presence of gamma fluxes in addition to the neutron flux which is being measured.

Applicants accomplish the above advantages and overcome the difficulties inherent in prior art devices, in part, by splitting up the region containing neutron sensitive material into a plurality of spaced individual regions of large area, thereby providing a high surface to volume ratio. In order to overcome the effect of self-absorption in the neutron sensitive regions, there is disposed intermediate to each of said regions, and preferably also outside of each of said regions, a layer of moderator material, wherein the neutron flux, due to the unique nuclear characteristics of such moderator material, builds up to a high intensity. Applicants have found that the thickness of each layer of moderator material, for most advantageous effect, should have a critical relationship to the thermal diffusion length of such moderator material, as will be described in detail hereinafter. Applicants have also found that for greatest effectiveness, a critical relationship should be maintained between the sum of the thicknesses of the moderator layers and the slowing down length of the moderator material, as will be fully explained hereinafter.

Other objects and advantages of the present invention will become apparent from the accompanying description when taken in connection with the accompanying drawings.

Figure 2:
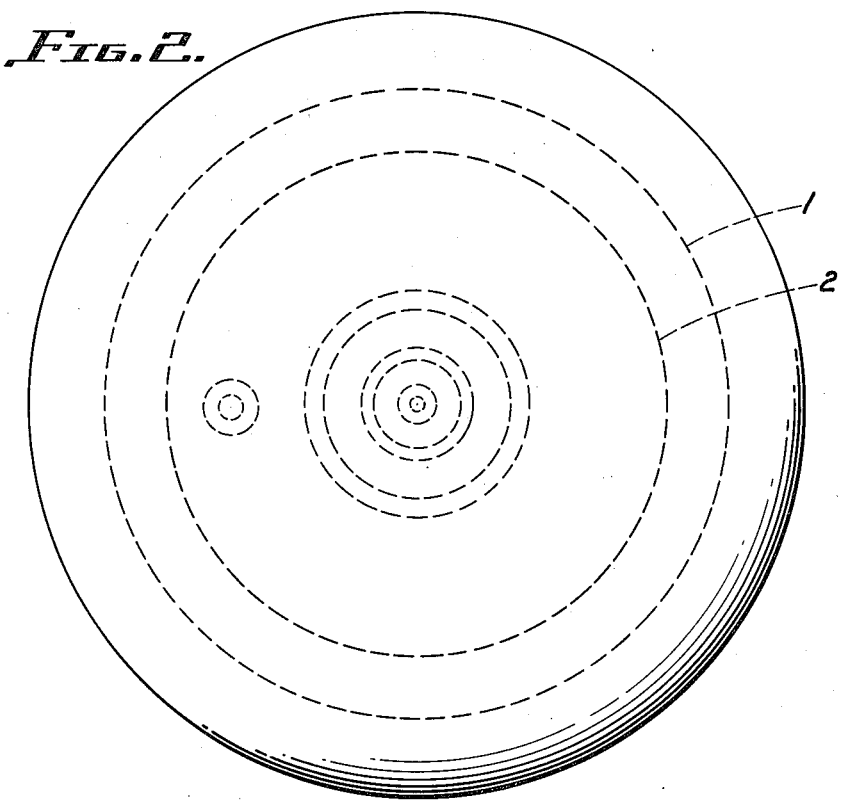
Fig. 2 is a top plan view of the structural portion of Fig. 1.
Figure 1:
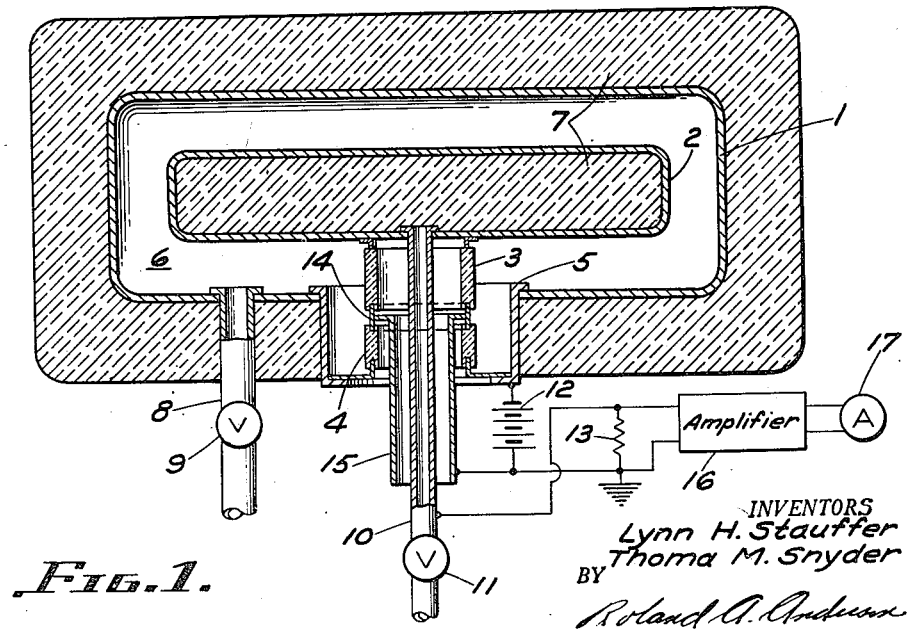
Fig. 1 is a combined sectional elevation view of the structure, and schematic wiring diagram of the circuit, of the present invention.

Referring now to the drawings, there is provided an outer metal chamber 1 and an inner metal chamber 2. Chambers 1 and 2 are gas-tight and are insulated from each other by tubular glass insulators 3 and 4. Insulators 3 and 4, in conjunction with tubular metallic member 5 serve as a support for the inner chamber 2. Chambers 1 and 2 are preferably, although not necessarily, circular in cross section as indicated in Fig. 2. The space within chamber 2 is filled with a moderator material 7, and the space between chamber 2 and chamber 1 is filled to a high pressure with a gaseous material 6, the properties and characteristics of materials 6 and 7 to be more fully discussed hereinafter. Metal filling tube 8 and its associated valve 9 are provided for the insertion and removal of material 6; and metal filling tube 10 and its associated valve 11 are provided for the insertion and removal of moderator material 7. Surrounding the outer chamber 1 on all sides, there is preferably disposed an additional layer of moderator material 7.

A source of direct voltage, such as battery 12, is provided, the negative terminal of the battery being connected to chamber 1 by way of tubular member 5, and the positive terminal of the battery being connected to ground. Chamber 2 is also connected to ground. Chamber 2 is also connected to ground through tube 10 and resistance 13. A metal guard ring 14 is sealed between insulators 3 and 4 for the purpose of preventing creepage of charge along these insulators. A tubular metal shield 15, surrounding and concentric with filling tube 10, is provided, this shield terminating at, and being connected to, guard ring 14. Ring 14 and shield 15 are grounded, as shown. If desired, the insulators 3 and 4 could be made integral and the guard ring 14 replaced by a grounded conducting band placed both inside and outside of the integral insulator.

A conventional D. C. amplifier 16 is connected to receive the voltage developed across resistance 13 as its input signal. The output of the D. C. amplifier 16 feeds any suitable indicating device or recording instrument, indicated as ammeter 17.

It will be apparent that the space between chambers 1 and 2 will operate in the manner of a conventional ionization chamber, with the chambers 1 and 2 constituting the oppositely charged electrodes. The external circuit constitutes a conventional amplifying circuit normally associated with an ionization chamber.

The gaseous material 6 filling the space between chamber 1 and chamber 2 is one which contains a nucleus with a large slow cross section and thereupon immediately releasing a charged particle. $Li^6$ and $B^{10}$ are examples of such nuclei involving the absorption of a slow neutron and the emission of an alpha particle. The gaseous material 6 is preferably boron trifluoride gas at a high pressure. Since naturally occurring lithium contains only about 10% $Li^6$ and naturally occurring boron contains only about 20% $B^{10}$, increased efficiency can be realized by employing a gaseous material enriched in the neutron sensitive isotope, as discussed in the above referred to Kallmann patent.

Gaseous compounds containing fissionable nuclei, such as, $U^{235}$, $Pu^{239}$, or $U^{233}$ would, of course, also be suitable for use as the gaseous material 6, the charged fission fragments released in the fission process serving, in such case, to ionize the gas.

Although the gaseous material 6 preferably contains within itself the neutron sensitive material, this, of course, is not necessary, it only being required that there be provided within chamber 1 any gas, and that neutron sensitive material be somehow disposed throughout or adjacent to the gas. Thus, if desired, the neutron sensitive material could be in solid form disposed on a plurality of supporting strips within chamber 1, for example, or disposed on the inner surface of chamber 1 and the outer surface of chamber 2.

The material 7 within chamber 2 should be characterized by a high neutron scattering cross section, a high value of ξ, a low neutron absorption cross section, and should be fairly dense. Non-gaseous hydrogen-containing compounds, such as water, paraffin, or hexane, constitute good moderators and are eminently suitable for this purpose. For reasons which will become evident hereinafter, paraffin is ideal for use as material 7, and its use is preferred in the present invention.

In operation, fast neutrons and intermediate energy neutrons entering the meter are slowed down by collision with nuclei of the moderator material 7 to a low energy at which they are readily absorbed in material 6. These neutrons, as well as already thermal neutrons entering the meter, are captured in the neutron sensitive material 6. The resultant emission of a charged particle produces ionization of the gaseous material 6, which ionization produces a proportional current flow through resistance 13. This current flow is amplified by amplifier 16, and the amplified value is indicated or recorded on meter 17, thereby providing an indication of the overall neutron flux.

Applicants have found that the sensitivity of the meter is highest when the thickness ($t$) of each individual layer of moderator material is of the order of twice the thermal diffusion length ($L$) of this material. Applicants have also discovered that the effectiveness of the moderator material in slowing down neutrons is most pronounced when the summation of the thicknesses of the individual layers of moderator material is of the order of the slowing down length ($L_f$) of the material for neutrons of the particular energy level expected to be encountered in any specific application.

Paraffin is uniquely adapted for use as material 7 because of its particular values of thermal diffusion length and slowing down length and the particular relationship of such values. Since its thermal diffusion length is about two-thirds of an inch, the preferred thickness of each of the individual layers of moderator material is about one and one-third inch, which, of course, is an eminently practicable dimension. The slowing down length of paraffin for neutrons of the energy level most frequently encountered in practice (fission neutrons having an average energy of about 2 m. e. v.) is about four inches. Thus, the preferred total thicknss of all the layers of paraffin is not only in the practicable range, but also turns out in the most usual case to be about three times the preferred value of the individual thicknesses. It is evident that this fortuitous circumstance permits the realization of both of the preferred relationships by a very simple and practicable structure utilizing two spaced layers of neutron sensitive gas to separate three spaced layers of paraffin, as shown in the drawings.

It is understood that all matters contained in the above description are illustrative only and do not limit the scope of this invention as it is intended to claim the invention as broadly as possible in view of the prior art. In particular, it should be understood that as many additional alternate layers of neutron sensitive material and moderator material may be provided as is found to be practicable. Also, it should be understood that the meter would be operable, although not as satisfactory, without the surrounding layer of moderator material, that is, with only one intermediate layer of moderator material.

We claim:

1. A neutron meter comprising a plurality of spaced regions containing a gaseous boron compound, at least one intermediate region formed of a non-gaseous hydrogen containing compound, and means for measuring the ionization of said gaseous boron compound.

2. A neutron meter comprising a plurality of spaced layers containing nuclei capable of emitting a charged particle upon the absorption of a thermal neutron, at least one intermediate layer formed of a moderator material, and means responsive to the ionization produced by said charged particle, said intermediate layer having a thickness of the order of twice the thermal diffusion length of said moderator material.

3. A neutron meter comprising a plurality of spaced layers containing nuclei capable of emitting a charged particle upon the absorption of a thermal neutron, at least one intermediate layer formed of a moderator material, and means responsive to the ionization produced by said charged particle, the total of the thicknesses of said intermediate layers being of the order of the slowing down length of said moderator material for neutrons of the energy level intended to be measured.

4. A neutron meter comprising a plurality of spaced layers containing nuclei capable of emitting a charged particle upon the absorption of a thermal neutron, at least one intermediate layer formed of a moderator material, and means responsive to the ionization produced by said charged particle, at least one of said intermediate layers having a thickness of the order of twice the thermal diffusion length of said moderator material, the total of the thicknesses of said intermediate layers being of the order of the slowing down length of said moderator material for neutrons of the energy level intended to be measured.

5. A neutron meter comprising an inner gas-tight metallic container and a concentric outer gas-tight metallic container, said containers being insulated from one another, said inner container being filled with a non-gaseous moderator material, said outer container being filled with a gas capable of emitting a charged particle upon the absorption of a thermal neutron, and an external circuit associated with said containers, said circuit including means for maintaining said containers at different potentials and means for measuring the current flowing in said external circuit.

6. Apparatus, as claimed in claim 5, further including an additional layer of moderator material surrounding said outer chamber.

7. Apparatus, as claimed in claim 5, wherein said non-gaseous moderator material is paraffin, and said gas is boron trifluoride.

LYNN H. STAUFFER.
THOMA M. SNYDER.

REFERENCES CITED

The following references are of record in the file of this patent:

Atomic Energy Commission Document, AECD, 1954, 5 pages, March 8, 1948.